United States Patent Office 2,906,633
Patented Sept. 29, 1959

---

2,906,633

BITUMINOUS ROADMAKING MATERIAL

Erwin Thomann, Zurich, Switzerland, assignor to A.G. Balmholz Steinbrüche & Hartschotterwerke, Oberhofen, Bern, Switzerland, a company of Switzerland No Drawing. Application July 24, 1956
Serial No. 599,686

Claims priority, application Switzerland August 16, 1955

1 Claim. (Cl. 106—82)

The present invention relates to the production of a roadmaking material and is characterized by the fact that the bituminous mix for the road surface has a mineral dust added to it which has been impregnated with an aqueous emulsion of at least one hydrocarbon, which emulsion contains water glass as a stabilizer, and further characterized by the fact that the impregnation is effected with the admission of air.

It is known that motorized road traffic, which increases in intensity and speed from year to year, calls for greater road safety. Among the measures that contribute to improving this road safety are all those capable of making the roadway surface as rough as possible and of keeping it permanently and uniformly rough in any weather, at any temperature and with any type of traffic.

One way of substantially improving this roughness in road surfaces of the bituminous type is to add to the mixture a certain proportion of fine mineral dust which has been previously impregnated with an impregnating material selected from the group of hydrocarbons. Rock dust, ground slag, ground clinker, cement, hydraulic lime, ash and the like can be used as the dust. Suitable impregnating agents are, for instance, hydrocarbons occuring as waste products in petroleum distillation, such as bitumen, heavy oil, gas oil, kerosene or gasoline, and those which are obtained as by-products in the gasification or carbonization of mineral coal, such as tar and tar oils. Mixes can be produced from both groups and used for the aforesaid purposes.

Mixes of one or the other group are generally used as impregnating agents in the known impregnating processes, the lighter oil component promoting liquefaction and therefore also being termed flux oil or flux agent. The addition of such a flux agent is intended, on the one hand, to make the impregnating agent thinly liquid so as to facilitate its penetration into the fine surface pores of the dust, and on the other hand said addition is intended to facilitate impregnation at low working temperatures. As the proportion of flux agent is increased, therefore, the impregnating temperature can be reduced more and more so that finally even cold impregnation is possible, i.e. impregnation can be effected, if need be, without preheating the dust and the impregnating liquid.

As these impregnating agents are always oily substances, the dust to be impregnated must be dry and, if necessary, predried even when the cold process is applied. Furthermore, certain types of dust tend to repel all oily substances so that not only is the impregnating process delayed, but the impregnation itself is inhomogeneous. In addition, some types of dust, among which are to be found even certain rock dusts, have a resistance to pressure and wear which is regarded as inadequate and they must therefore not be used, although it is difficult to find a substitute in certain areas which do not have any suitable rocks.

All these drawbacks are eliminated by converting the oily impregnating agent generally used hitherto into an aqueous emulsion, in which water suitably becomes the dispersion agent and the oily constitutents the dispersed phase. Water glass is used to stabilize the emulsion. This water glass component not only has the task of keeping the emulsion stable; in another sense, too, it plays a role which is of decisive importance for the invention. This role is based on the fact that water glass, on coming into contact with air in the mixture, is subject to a chemical reaction, as a result of which the silicic acid contained in said water glass is cleaved, simultaneously binds the emulsion water to it, dries quickly and hardens. The rapidly solidifying silicic acid, however, mixed with the hydrocarbon component, enters the fine surface pores of every grain of dust and envelops the latter like a thin coating which, because it is enriched with silicic acid, increases the dust grain's resistance to pressure and wear, which resistance was inadequate in certain cases of conventional road materials. The increase in resistance of the grains is due to the fact that those grains undergo an extensive hardening process and thus can be made to meet the requirements for the present purpose.

The composition of the emulsion is advantageously adapted to the adsorption and absorption properties of the dust to be impregnated. By way of example, it may vary between the following limits:

| | Percent by weight | |
|---|---|---|
| Bitumen containing flux oil | 30 | to 40 |
| Tall oil as emulsifier | 0.3 | to 1 |
| Water glass as stabilizer | 20 | to 10 |
| Water | 49.7 | to 49 |
| Totals | 100 | 100 |

Suitable mixing temperature: 60° C. to 70° C.

The proportion of impregnating emulsion in relationship to the dust to be impregnated can also be adapted to the adsorption properties of the dust; it may, by way of example, vary between 5 and 15 percent by weight, related to the total weight of the mix.

On completion of the impregnation process the dust, impregnated by way of example in an open mixing drum, is already in the form of a dry powder which can be poured into bags for storage and dispatch. It is ready for use and can now, as already mentioned, be added to the road surface mix and produce the desired increase in the roughness of the roadway.

It will be understood that the impregnated dust or filler thus produced may also be considered as an intermediary product which may be brought on the market independent of the bituminous mix.

Various changes and modifications may be made without departing from the spirit and scope of the present invention and it is intended that such obvious changes and modifications be embraced by the annexed claim.

I claim:

A bituminous road making material comprising an emulsion for impregnating mineral dust consisting essentially of 30 to 40% by weight of bitumen and a flux oil, water, 0.3 to 1% by weight of tall oil, and a mineral dust to be impregnated, said emulsion further containing between 20 to 10% by weight of water glass in said emulsion with said emulsion being under the influence of air, whereby said water glass in said emulsion binds said water in said emulsion to thereby facilitate rapid drying of said mineral dust in finely powdered form while preventing mineral dust conglomeration.

References Cited in the file of this patent

UNITED STATES PATENTS

| | | |
|---|---|---|
| 1,956,779 | Sparks | May 1, 1934 |
| 2,498,862 | Pettjean | Feb. 28, 1950 |
| 2,568,850 | Fasold et al. | Sept. 25, 1951 |
| 2,670,332 | McCoy | Feb. 23, 1954 |

FOREIGN PATENTS

| | | |
|---|---|---|
| 861 | Great Britain | 1908 |
| 474,163 | Great Britain | Oct. 27, 1937 |
| 667,054 | Great Britain | Feb. 20, 1952 |
| 683,170 | Great Britain | Nov. 26, 1952 |